United States Patent [19]

Heller et al.

[11] Patent Number: 4,607,696

[45] Date of Patent: Aug. 26, 1986

[54] TOPICAL VISCOSITY CONTROL FOR LIGHT HYDROCARBON DISPLACING FLUIDS IN PETROLEUM RECOVERY AND IN FRACTURING FLUIDS FOR WELL STIMULATION

[75] Inventors: John P. Heller; Dileep K. Dandge, both of Socorro, N. Mex.

[73] Assignee: New Mexico Tech. Research Foundation, Socorro, N. Mex.

[21] Appl. No.: 771,504

[22] Filed: Aug. 30, 1985

[51] Int. Cl.$^4$ ............................................. E21B 43/22
[52] U.S. Cl. ..................................... 166/275; 166/308; 252/8.551; 252/8.554
[58] Field of Search ............................. 166/275, 308; 252/8.55 D, 8.55 R, 315.1

[56] References Cited

U.S. PATENT DOCUMENTS 3,410,797  11/1968  Walker et al. ................... 252/8.5 C Primary Examiner—Stephen J. Novosad
Assistant Examiner—Thomas J. Odar

[57] ABSTRACT

Solvent-type flooding fluids comprising light hydrocarbons in the range of ethane to hexane (and mixtures thereof) are used to displace crude oil in formations having temperatures of about 20 degrees to about 150 degrees Centigrade and pressures above about 650 psi, the light hydrocarbons having dissolved therein from about 0.05% to about 3% of an organotin compound of the formula $R_3SnF$ where each R is independently an alkyl, aryl or alkyaryl group from 3 to 12 carbon atoms. Under the pressures and temperatures described, the organotin compounds become pentacoordinated and linked through the electronegative bridges, forming polymers within the light hydrocarbon flooding media to render them highly viscous. Under ambient conditions, the viscosity control agents will not readily be produced from the formation with either crude oil or water, since they are insoluble in the former and only sparingly soluble in the latter.

12 Claims, No Drawings

TOPICAL VISCOSITY CONTROL FOR LIGHT HYDROCARBON DISPLACING FLUIDS IN PETROLEUM RECOVERY AND IN FRACTURING FLUIDS FOR WELL STIMULATION

BACKGROUND OF THE INVENTION

It has been known prior to the present invention to displace crude oil from petroleum-bearing formations through the use of solvent floods which, under the appropriate pressures, will form liquid or liquid-like fronts more or less similar to the aqueous flooding media or displacing fluids which have become far more common in practice. The solvent-type flooding media or displacing fluids used in the past have generally been light hydrocarbons, ranging from ethane to pentane, and sometimes including hydrocarbons up to about 9 carbons in length, compressed to a density high enough that they are miscible with and/or act as solvents for many of the lighter components of the petroleum in the porous oil-bearing formations. The injected flooding media together with the lighter hydrocarbon fractions of the crude oil with which they are miscible tend to combine to displace the heavier fractions from the oil-bearing pores of the formation, as proposed by Hutchinson and Braun in "Phase Relations of Miscible Diosplacement in Porous Media", Am. Inst. of Chem. Engrs>Jnl., v 7 (1961) pp 64–74.

Light hydrocarbon flooding has been used commercially as a practical method of displacing crude, but has not been as widely accepted as waterflooding at least partly because of the great difference in viscosities of the flooding media from that of the crude oil; light hydrocarbon flooding media tend to flow freely in the more permeable portions of the formation, bypassing the less accessible and more viscous crude oil in the greatest part of the formation. As is known in the art of crude oil displacement, the escape or dissipation of the injected fluid in this manner is highly inefficient and has long been a problem for those interested in devising ways to displace crude oil from oil-bearing formations. We are not aware of any successful attempts to introduce polymers or other viscosity-modifying materials to light hydrocarbon displacing media to control their mobility in the formations.

The formation of coordination polymers by certain organotin compounds under certain conditions was described by Janssen, Luijten and van der Kerk in 82 RECUEIL 90 (1963) and 1 J. Organometallic Chemistry 286 (1964). Tributyltin fluoride was shown to be a coordination polymer in solution by Dunn and Oldfield, J. Macromolecular Science A4(5) pp 1160–1176 (1970). Solutions of tri-n-butyl tin fluoride in hexane were described as having very high viscosities which may be significantly reduced by the addition of polar solvents to the solutions.

The following explanation has been offered in the literature for this behavior of organotin fluoride compounds in solution. A single isolated molecule of, for example, tri-n-butyl tin fluoride possesses a dipole moment due to the electronegativity difference between tin and fluorine. This leads to a weak dipole-dipole type interaction between adjacent molecules, resulting in tin atoms becoming pentacoordinated and linked through fluorine bridges. As all the organotin fluoride molecules possess this dipole moment, an infinitely long yet transient linear polymer chain is formed. These transient chains cause a large increase in viscosity of the solution, and yet are not subject to permanent damage, as are ordinary polymers, due to excessive shear strain in the solution.

Relevant patent literature includes U.S. Pat. No. 3,979,354 to Dyckman et al, wherein trialkyltin groups are incorporated in various kinds of polymers and utilized for their antifouling abilities. The trialkyltin moieties do not form polymers themselves in this disclosure.

Example VI of U.S. Pat. No. 4,086,297 illustrates the addition of tributyl tin fluoride in high concentrations to thermoplastic film-forming polymers to render them microbiocidal. No inference is raised, however, of the formation of a TBTF polymer at any stage of the process.

In U.S. Pat. Nos. 4,153,574 and 4,191,580, Beiter and Hafner state that tributyl tin fluoride has a "strong tendency to agglomerate" when dispersed. The "unusual behavior" is explained in column 1, lines 32–38, i.e. a relatively weak attractive force on the tin atom of one molecule and the fluorine atom of another results in a structure resembling a linear polymer molecule. The undesired formation of this molecule is prevented through the use of various additives.

The delayed gelation of polymers and other materials in formation plugging and the like is reviewed in U.S. Pat. No. 4,461,352, which employs a borate salt with acrylamide polymers; the gel formation is pH and temperature dependent.

The reader may also be interested in the in situ formation of chromium-containing polymers for the stabilization of clay in subterranean environments disclosed by Kalfoglou in U.S. Pat. No. 4,129,183; aside from the differences in chemical structure of the polymers created and the different objectives of the inventors, the topical process of Kalfoglou is conducted in aqueous solution, which we do not employ.

SUMMARY OF THE INVENTION

Our invention involves the use of certain organotin compounds to significantly increase the efficiency of crude oil displacement from the formation by flooding media such as mixtures of light hydrocarbons. Specifically, we employ compounds of the formula $R_3SnF$ together with the light hydrocarbon flooding media to provide the topical formation and application of polymers to the flooding media to render them highly viscous. Under surface (ambient) conditions the organotin compounds can be easily handled since they exist as crystalline powders. When dispersed in the flooding media they do not form polymers and viscous solutions until they are placed under the appropriate conditions of temperature, pressure and concentration. The in situ, or topical, formation of the polymer thus greatly enhances the efficiency of the polymer flooding process. Unlike the typical waterflood, our process does not require the difficult dissolution of polymers such as polyacrylamide above ground to form highly viscous solutions which are difficult to handle.

The tin compounds we employ have the formula $R_3SnF$ where each R is independently an alkyl group (either normal or branched) having from 3 to about 12 carbon atoms, an aryl group having from 6 to about 12 carbon atoms, and/or an alkylaryl group having from about 7 to about 12 carbon atoms. Examples of compounds we may use are tri-n-propyltin fluoride, tri-n-butyltin fluoride, tri-n-amyltin fluoride, tri-n-hexyltin fluoride, tri-n-heptyltin fluoride, tri-n-octyltin fluoride, tri-n-nonyltin fluoride, tri-n-decyltin fluoride, tri-n-undecyltin fluoride, dibutylamyltin fluoride, 2-ethylhexyltin fluoride.

The flooding medium may comprise light hydrocarbons from ethane to hexane or mixtures thereof, and may include small amounts of hydrocarbons having up to about 9 carbon atoms. They are solvents which have high enough vapor pressures that at the temperature of the reservoir they can be kept in the liquid state, or at a liquid-like density, only by confining them at pressures significantly greater than atmospheric. The solvent properties of such dense fluids, whether thay are above or below their critical temperatures, are such that they are completely miscible with a wide range of the lighter components of the crude oil. When used as displacing fluids in oil-containing porous media, such fluids are able to extract the lighter components from the crude in the neighborhood of the displacement front. With the aid of these lighter hydrocarbon fractions, they can build a "multiple contact miscible" displacement front of the type described by Hutchinson and Braun in 1961.

To minimize the dissipation of the flooding medium into fissures and areas of relatively little resistance within the oil-bearing rock formations, and to retard the formation of "viscous fingers" due to an unfavorable mobility ratio, our invention incorporates from about 0.05% to about 3% of an organotin compound of the type described elsewhere herein into the flooding medium at or before the time of injection. The organotin compound is normally completely unpolymerized at that point but becomes polymerized as the pressures increase in the application of the flooding medium to the formation. The organotin compound, we believe, becomes pentacoordinated and linked through the bridges of fluorine atoms, forming polymers of unknown but probably very high molecular weight. Pressures above about 650 psi, which are typical of oil-producing formations at depths greater than 1500 feet, are ideal for converting our organotin compounds into polymers responsible for viscosities of 0.1 to 20 cps, even at temperatures of 20 to 100 degrees Centigrade. Generally, one would expect the density range of the light hydrocarbon flooding medium to vary from about 0.45 to about 0.7 g/cm$^3$ under the conditions of the formations mentioned.

Although we have not experimentally defined the molecular weight of the polymers formed under the conditions of use described, we believe the polymer chains formed contain from a few thousand to a few tens of thousands of the organotin units. One interesting and distinct advantage of the topical polymer application technique is that the polymers will form only under the appropriate pressure conditions; if the pressure conditions are removed, the displacing fluid expands and the polymer dissociates into the original simple compound and is fully capable of forming new polymers under the same previously applied pressure conditions. Thus, one may control the formation of the polymer and the concomitant enhanced viscosity by directing the compound in the appropriate solvent to a location of high pressure.

The relative viscosity data in Tables 1, 2, and 3 were obtained by measuring the time required for a stainless steel cylinder to fall from one point to another in a tube containing the material measured. The relative viscosity is the ratio of the time consumed in the solvent plus additive to the time consumed for the fall in the solvent alone. Measurements in all tables were under pressures of 1200 psi and at 25 degrees Centigrade.

TABLE 1

| Conc. of Bu$_3$SnF in Butane (wt %) | Relative Viscosity |
|---|---|
| 0.128 | 3.35 |
| 0.23 | 4.59 |
| 0.27 | 5.83 |

TABLE 2

| Conc. of Bu$_3$SnF in Propane (wt %) | Relative Viscosity |
|---|---|
| 0.12 | 1.49 |
| 0.19 | 5.39 |
| 0.26 | 8.98 |

TABLE 3

| Conc. triamyltin fluoride in n-butane (wt %) | Relative Viscosity |
|---|---|
| 0.26 | 3.5 |
| 0.35 | 5.6 |
| 0.43 | 19.4 |

TABLE 4

| Conc. dibutyl amyltin fluoride in hexane | Viscosity (cp) |
|---|---|
| 0.18 | 3.5 |
| 0.20 | 5.2 |
| 0.23 | 7.3 |
| 0.32 | 21.6 |

TABLE 5

| Conc. dibutyl amyltin fluoride in n-pentane | Viscosity (cp) |
|---|---|
| 0.235 | 12.94 |
| 0.275 | 17.94 |
| 0.33 | 33.84 |

TABLE 6

| Conc. triamyltin fluoride in n-hexane | Viscosity (cp) |
|---|---|
| 0.29 | 8.3 |
| 0.36 | 18.5 |
| 0.41 | 24.2 |
| 0.58 | 150.8 |

Our hydrocarbon/organotin solutions may also be used for selective plugging, i.e. to plug the relative permeable portions of a formation under high pressure, to be followed by a waterflood or other means of displacing crude oil in the main portions of the formation.

These solutions of the described organotin compounds in compressed light hydrocarbons may also be used in oil or gas wells as fracturing fluids, in which use the increased viscosity can enable the fluid to entrain and carry sand, or other suitable proppant grains as are known in the art, into fractures induced in the formation by high pressure imposed on the fluid by the usual pumping means at the surface.

We claim:

1. Method of removing crude oil from an underground oil-bearing formation comprising injecting into an injection well in the formation a solution of a compound of the formula R$_3$SnF where each R is independently an alkyl, aryl or alkylaryl group having from 3 to about 12 carbon atoms, in a solvent hydrocarbon having from two to six carbon atoms, moving said solution in the direction of the oil to be removed under conditions whereby the organotin compound increases the viscosity thereof, displacing at least a portion of said oil with said solution, and removing the displaced oil through a producing well.

2. Method of claim 1 wherein the organotin compound is tri-n-butyl tin fluoride.

3. Method of claim 1 wherein the injection takes place under a pressure of at least 650 psi.

4. Method of claim 1 wherein the injected hydrocarbon is ethane.

5. Method of claim 1 wherein the injected hydrocarbon is propane.

6. Method of claim 1 wherein the injected hydrocarbon is butane.

7. Method of claim 1 wherein the organotin compound is present in the hydrocarbon in a concentration of 0.05% to 3%.

8. Method of increasing the viscosity of a medium of saturated hydrocarbons having 2-6 carbon atoms or mixtures thereof comprising adding thereto, at a pressure less than 650 psi, at least about 0.05% by weight of a compound of the formula $R_3SnF$ wherein each R is independently an alkyl, aryl or alkylaryl group having from 3 to 12 carbon atoms, and increasing the pressure to over 650 psi.

9. Method of fracturing a subterranean formation comprising adding to a solvent hydrocarbon having about 2-6 carbon atoms at least about 0.05% of a compound of the formula $R_3SnF$ wherein R is an alkyl, aryl, or alkylaryl group having 3-12 carbon atoms, adding to the mixture a granular propping agent, and injecting the mixture into the formation under at least 650 psi, whereby the formation is fractured and the solvent hydrocarbon becomes viscous and carries the propping agent into the fissures of the formation.

10. A fracturing and propping medium comprising hydrocarbons having from 2 to about 6 carbon atoms, about 0.05 to about 3 percent by weight of a compound of the formula $R_3SnF$ where each R is independently an alkyl, aryl, or alkylaryl group having from 3 to about 12 carbon atoms and an effective amount of granular propping agent.

11. The fracturing and propping medium of claim 10 wherein the propping agent is sand.

12. Method of displacing crude oil in a subterranean formation comprising injecting into said formation under a pressure of at least 650 psi a solution of at least about 0.05 percent tributyltin fluoride in a displacing medium comprising hydrocarbons having 2 to about 6 carbon atoms.

* * * * *